United States Patent
Liu et al.

(10) Patent No.: US 11,216,829 B1
(45) Date of Patent: Jan. 4, 2022

(54) PROVIDING ONLINE CONTENT

(71) Applicant: Google LLC, Mountain View, CA (US)

(72) Inventors: Ting Liu, Sunnyvale, CA (US);
Zhengzhu Feng, Bellvue, WA (US);
Zhongyi Lin, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/283,905

(22) Filed: Feb. 25, 2019

Related U.S. Application Data

(63) Continuation of application No. 13/609,119, filed on Sep. 10, 2012, now Pat. No. 10,229,424.

(51) Int. Cl.
*G06Q 30/02* (2012.01)

(52) U.S. Cl.
CPC .................... *G06Q 30/02* (2013.01)

(58) Field of Classification Search
CPC ... H04L 29/08198; H04L 67/20; H04L 67/02; H04L 67/22; H04N 21/00; H04N 21/25858; H04N 21/4622; H04N 21/6582; H04N 21/8173; H04N 21/2547; H04N 21/44222; H04N 21/466; H04N 21/4668; H04N 21/4756; H04N 21/4826; G06Q 30/02
See application file for complete search history.

(56) References Cited

U.S. PATENT DOCUMENTS

| | | | |
|---|---|---|---|
| 7,162,696 B2 | 1/2007 | Wakefield | |
| 7,698,261 B1 | 4/2010 | Khoshnevisan | |
| 7,779,103 B1 | 8/2010 | Fikes et al. | |
| 7,886,032 B1 | 2/2011 | Louz-On | |
| 8,412,698 B1* | 4/2013 | Sarukkai | G06F 16/9535 707/713 |
| 2006/0069612 A1 | 3/2006 | Hurt et al. | |
| 2006/0069616 A1 | 3/2006 | Bau | |
| 2007/0156519 A1 | 7/2007 | Agassi et al. | |
| 2007/0198609 A1* | 8/2007 | Black | G06Q 10/087 |
| 2008/0052195 A1* | 2/2008 | Roth | G06Q 30/02 705/14.69 |
| 2008/0201216 A1 | 8/2008 | Almeida | |
| 2009/0113288 A1* | 4/2009 | Thampy | G06F 16/9577 715/234 |
| 2011/0071900 A1 | 3/2011 | Kannath | |
| 2011/0077998 A1 | 3/2011 | Yan | |
| 2011/0153432 A1* | 6/2011 | Forbes | G06Q 30/02 705/14.66 |
| 2011/0225608 A1 | 9/2011 | Lopatecki | |

(Continued)

OTHER PUBLICATIONS

Teevan (Personalizing search via automated analysis of interests and activities, Aug. 2005, 8 pgs (Year: 2005).*

(Continued)

*Primary Examiner* — Kevin T Bates
*Assistant Examiner* — Ranjan Pant
(74) *Attorney, Agent, or Firm* — Fish & Richardson P.C.

(57) ABSTRACT

Systems and methods for providing online content include evaluating a custom selection rule specified by a content provider. The custom selection rule may be used to control whether content from the provider is eligible for selection by a content selection service. The content selection rule may include one or more logical operators, a selected interest category and/or a selected list of one or more client identifiers.

20 Claims, 7 Drawing Sheets

(56) References Cited

U.S. PATENT DOCUMENTS

| | | |
|---|---|---|
| 2011/0246267 A1 | 10/2011 | Williams et al. |
| 2011/0288937 A1 | 11/2011 | Manoogian, III |
| 2012/0010939 A1 | 1/2012 | Krishnannoorthy |
| 2012/0036015 A1* | 2/2012 | Sheikh ............... G06Q 30/0261 705/14.54 |
| 2012/0110008 A1 | 5/2012 | Pieper |
| 2013/0073387 A1* | 3/2013 | Heath ................... G06Q 30/02 705/14.53 |
| 2014/0068459 A1 | 3/2014 | Graham |

OTHER PUBLICATIONS

Google, AdWords Help, How do I create a custom combination list?, support.google.com/adwords/bin/answer.Pv?hl=en&answer=171271, retrieved Apr. 16, 2012, 3 pages.

Google, AdWords Help, Where your ad can appear on the Display Network depending on your targeting methods, support.google.com/adwords/bin/answer.py?h l=en&answer= 1209882, retrieved Apr. 16, 2012, 4 pages.

Liu et al. (Personalized web search by mapping user queries to categories, Nov. 4-9, 2002, 8 Pages).

Matthijs et al. (Personalizing web search using long term browsing history, Feb. 9-12, 2011, 1O Pages).

Teevan et al. (Personalizing search via automated analysis of interests and activities, Aug. 15-19, 2005, 8 Pages).

* cited by examiner

PROVIDING ONLINE CONTENT

CROSS-REFERENCE TO RELATED APPLICATION

This application is a continuation of U.S. application Ser. No. 13/609,119, filed Sep. 10, 2012, the contents of which are incorporated by reference herein.

BACKGROUND

The present disclosure relates generally to providing online content. The present disclosure more specifically relates to dynamically providing content based on its potential relevance to a user.

Online content may be available regarding any number of disparate topics. For example, a first website on the Internet may be devoted to the migratory habits of bats and a second website may be devoted to automotive repair. In many cases, a user must proactively seek out online content of interest to the user. For example, an Internet user may utilize a search engine to search for webpages devoted to automotive repair. The user may then navigate between the webpages in the search results until the user finds the webpage that most closely matches the user's interests.

SUMMARY

Implementations of the systems and methods for providing online content are described herein. One implementation is a computerized method for providing online content. The method includes receiving, at a processing circuit, a content selection request, the content selection request including a client identifier. The method also includes analyzing, by the processing circuit, history data associated with the client identifier to identify one or more interest categories, the history data being indicative of one or more visited webpages. The method further includes receiving a custom selection rule from a content provider. The custom selection rule includes a selection of an interest category, a selection of a client identifier list, and a logical operator. The method also includes associating the custom selection rule with content from the content provider. The method additionally includes selecting, by the processing circuit, the content from the content provider based in part on an evaluation of the custom selection rule. The method further includes providing, via a network, the content from the content provider to a client device.

Another implementation is a system for providing online content. The system includes a processing circuit operable to receive a content selection request, the content selection request including a client identifier. The processing circuit is also operable to analyze history data associated with the client identifier to identify one or more interest categories, the history data being indicative of one or more visited webpages. The processing circuit is further operable to receive a custom selection rule from a content provider. The custom selection rule includes a selection of an interest category, a selection of a client identifier list, and a logical operator. The processing circuit is additionally operable to associate the custom selection rule with content from the content provider and to select the content from the content provider based in part on an evaluation of the custom selection rule. The processing circuit is further operable to provide, via a network, the content from the content provider to a client device.

A further implementation is computer-readable storage medium having machine instructions stored therein, the instructions being executable by a processor to cause the processor to perform operations. The operations include receiving a content selection request, the content selection request including a client identifier. The operations also include analyzing history data associated with the client identifier to identify one or more interest categories, the history data being indicative of one or more visited webpages. The operations further include receiving a custom selection rule from a content provider. The custom selection rule includes a selection of an interest category, a selection of a client identifier list, and a logical operator. The operations also include associating the custom selection rule with content from the content provider and selecting the content from the content provider based in part on an evaluation of the custom selection rule. The operations additionally include providing the content from the content provider to a client device.

These implementations are mentioned not to limit or define the scope of this disclosure, but to provide examples of implementations to aid in understanding thereof.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
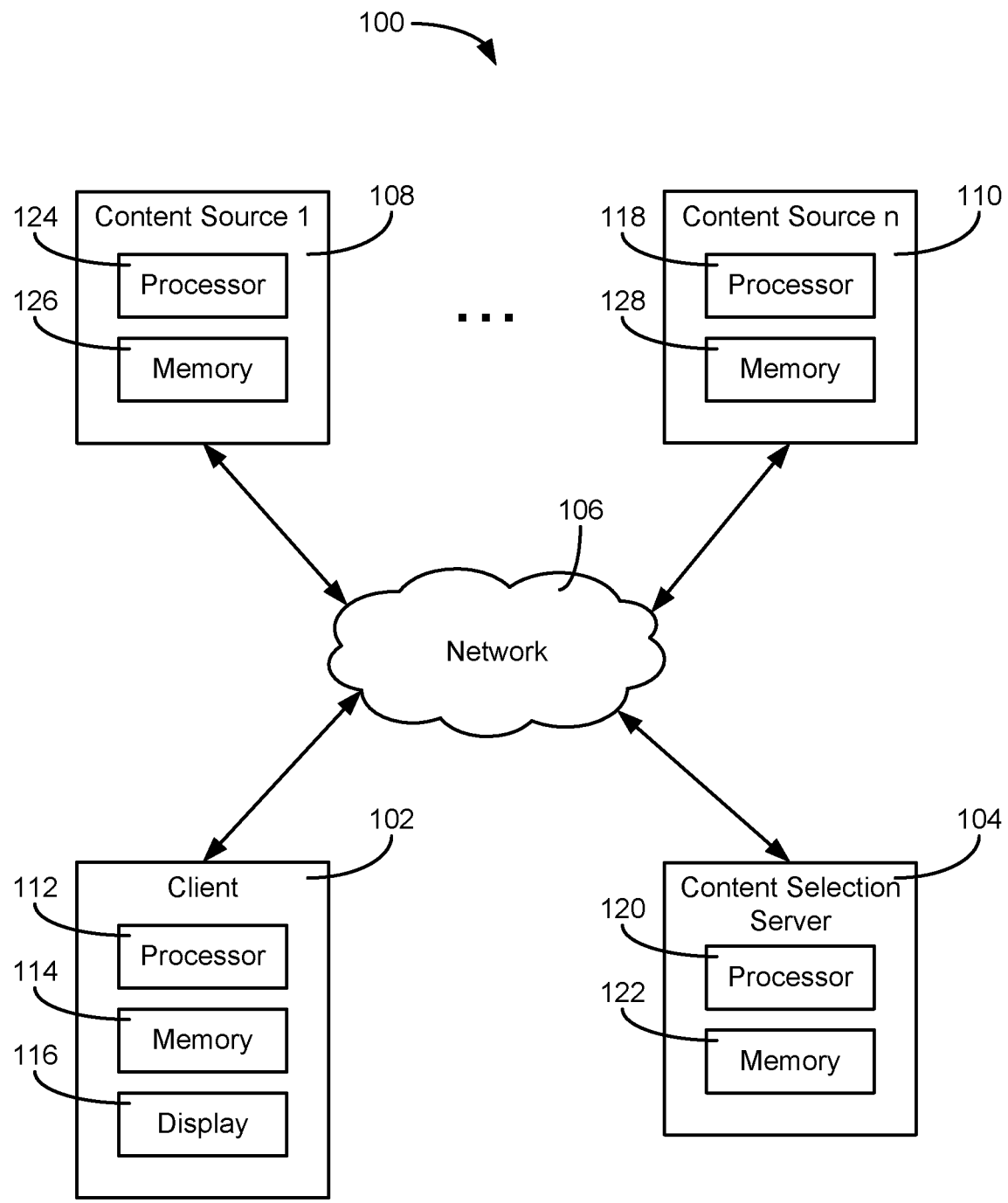
FIG. 1 is a block diagram of a computer system in accordance with a described implementation.

According to some aspects of the present disclosure, online content may be dynamically selected for a user based the user's potential interest in the content. Thus, a user may be provided content of interest without the user having to proactively locate the content. In some implementations, a user may opt in to allowing a content selection service to analyze history data indicative of online actions performed by the user. Such a service may be configured to select content of relevance to the user by identifying online actions performed by the user. For example, which types of content were requested by the user and how the user interacted with the content may be analyzed to determine potential interests of the user.

For situations in which the systems discussed herein collect personal information about a user, or may make use of personal information, the user may be provided with an opportunity to control which programs or features collect such information, the types of information that may be collected (e.g., information about a user's social network, social actions or activities, a user's preferences, a user's current location, etc.), and/or how third-party content may be selected by a content selection service and presented to the user. Certain data, such as a user identifier, may be anonymized in one or more ways before it is stored or used, so that personally identifiable information is removed when generating parameters (e.g., demographic parameters) used by the content selection service to select third-party content. For example, a user identifier may be anonymized so that no personally identifiable information about its corresponding user can be determined from it. In another example, a user's geographic location may be generalized where location information is obtained (such as to a city, ZIP code, or state level), so that a precise location of the user cannot be determined. Thus, the user may have control over how information is collected about him or her and used by the content selection service.

In various implementations, a content selection service may allow an entity that uses the service to specify a custom rule that restricts the content to being provided only to certain users. In some implementations, a custom rule may include any number of interest categories. For example, an online retailer of sports memorabilia may specify that advertisements from the retailer are to be provided to users interested in baseball or football. In some implementations, a custom rule may use any number of identifier lists (e.g., sets of one or more cookies, device serial numbers, etc.). Such an identifier list may be used by the service to represent a set of users that performed a certain online action. An identifier list may be known as a remarketing list or boom list, in some contexts. For example, a retail website may set a first cookie on a client device when the website is visited by a user, set a second cookie when the user adds an item to a shopping cart, and set a third cookie when the user completes the transaction. Thus, three different identifier lists may be generated, to represent the sets of users that performed the various steps involved in making a purchase. In one example, a custom rule may be used by the retailer in the content selection service to notify users that visited the retail website but did not make a purchase of an upcoming sale (i.e., the rule specifies that users that are in the first and not in the third list are to be notified).

Referring to FIG. 1, a block diagram of a computer system 100 in accordance with a described implementation is shown. System 100 includes a client 102 which communicates with other computing devices via a network 106. Client 102 may execute a web browser or other application (e.g., a video game, a channel guide for streaming content, a media player, etc.) to retrieve content from other devices over network 106. For example, client 102 may communicate with any number of content sources 108, 110 (e.g., a first content source through nth content source). Content sources 108, 110 may provide webpage data and/or other content (e.g., text documents, PDF files, and other forms of electronic documents) to client 102. In some implementations, computer system 100 may also include a content selection server 104 configured to select content to be provided to client 102. For example, content source 108 may provide a webpage to client 102 that includes additional content selected by content selection server 104 based in part on the content's potential relevancy to the user of client 102.

Network 106 may be any form of computer network that relays information between client 102, content sources 108, 110, and content selection server 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different types of user electronic devices configured to communicate via network 106 (e.g., a laptop computer, a desktop computer, a tablet computer, a smartphone, a digital video recorder, a set-top box for a television, a video game console, combinations thereof, etc.). Client 102 is shown to include a processor 112 and a memory 114, i.e., a processing circuit. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions. The instructions may include code from any suitable computer programming language such as, but not limited to, C, C++, C#, Java, JavaScript, Perl, HTML, XML, Python and Visual Basic.

Client 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which displays webpages and other data received from content sources 108, 110 and/or content selection server 104. In various implementations, electronic display 116 may be located inside or outside of the same housing as that of processor 112 and/or memory 114. For example, electronic display 116 may be an external display, such as a computer monitor, television set, or any other stand-alone form of electronic display. In other examples, electronic display 116 may be integrated into the housing of a laptop computer, mobile device, or other form of computing device having an integrated display.

Content sources 108, 110 may be one or more electronic devices connected to network 106 that provide content to client 102. For example, content sources 108, 110 may be computer servers (e.g., FTP servers, file sharing servers, web servers, etc.) or combinations of servers (e.g., data centers, cloud computing platforms, etc.). Content may include, but is not limited to, webpage data, a text file, a spreadsheet, images, search results, and other forms of electronic documents. Similar to client 102, content sources 108, 110 may include processing circuits comprising processors 124, 118 and memories 126, 128, respectively, that store program instructions executable by processors 124, 118. For example, the processing circuit of content source 108 may include instructions such as web server software, FTP serving software, and other types of software that cause content source 108 to provide content via network 106.

According to various implementations, content sources 108, 110 may provide webpage data to client 102 that includes one or more content tags. In general, a content tag may be any piece of webpage code associated with the action of including content with a webpage. According to various implementations, a content tag may define a slot on a webpage for additional content, a slot for out of page content (e.g., an interstitial slot), whether content should be loaded asynchronously or synchronously, whether the loading of content should be disabled on the webpage, whether content that loaded unsuccessfully should be refreshed, the network location of a content source that provides the content (e.g., content sources 108, 110, content selection server 104, etc.), a network location (e.g., a URL) associated with clicking on the content, how the content is to be rendered on a display, a command that causes client 102 to set a browser cookie (e.g., via a pixel tag that sets a cookie via an image request), one or more keywords used to retrieve the content, and other functions associated with providing additional content with a webpage. For example, content source 108 may provide webpage data that causes client 102 to retrieve content from content selection server 104. In another implementation, content may be selected by content selection server 104 and provided by content source 108 as part of the webpage data sent to client 102.

Similar to content sources 108, 110, content selection server 104 may be one or more electronic devices connected to network 106 that selects content to be provided to client 102 based on a predicted relevancy to the user of client 102. Content selection server 104 may be a computer server (e.g., FTP servers, file sharing servers, web servers, etc.) or a combination of servers (e.g., a data center, a cloud computing platform, etc.). Content selection server 104 may have a processing circuit including a processor 120 and a memory 122 that stores program instructions executable by processor 120. In cases in which content selection server 104 is a combination of computing devices, processor 120 may represent the collective processors of the devices and memory 122 may represent the collective memories of the devices. The processing circuit of content selection server 104 may be configured to conduct an auction to select content to be provided to client 102. For example, content selection server 104 may select content, such as an advertisement, to be provided with a webpage served by content source 108 or 110.

In some implementations, content selection server 104 may be configured to select content based on a user identifier associated with client 102. In general, a user identifier refers to any form of data that may be used to represent a user that has elected to receiving content selected by content selection server 104. In some implementations, a user identifier may be associated with a client identifier that identifies a client device to content selection server 104 or may itself be the client identifier. In some implementations, a user identifier may be associated with multiple client identifiers (e.g., a client identifier for a mobile device, a client identifier for a home computer, etc.). Client identifiers may include, but are not limited to, cookies, device serial numbers, user profile data, telephone numbers, or network addresses. For example, a cookie set on client 102 may be used to identify client 102 to content selection server 104. Client identifiers may also be anonymized such that personally-identifiable information about the corresponding user is not used by content selection server 104 to select content for the represented user.

Content selection server 104 may use information associated with a user identifier to select relevant content for the represented user, if the user has opted in to the functionality of content selection server 104. For example, content selection server 104 may analyze history data associated with a user identifier to determine one or more potential interest categories for the user identifier. History data may be any data associated with a user identifier that is indicative of an online event (e.g., visiting a webpage, interacting with presented content, conducting a search, making a purchase, downloading content, etc.). Content selection server 104 may select content to be provided in conjunction with other content by client 102 (e.g., as part of a displayed webpage, as a pop-up, within a video game, within another type of application, etc.).

Content selection server 104 may receive history data indicative of one or more online events associated with a user identifier. In implementations in which a content tag causes client 102 to request content from content selection server 104, such a request may include a client identifier for client 102 and/or additional information (e.g., the webpage being loaded, the referring webpage, etc.). Content selection server 104 may store such data to record a history of online events associated with a user identifier. In some cases, client 102 may provide history data to content selection server 104 without first executing a content tag. For example, client 102 may periodically send history data to content selection server 104 or may do so in response to receiving a command from a user interface device. In some implementations, content selection server 104 may receive history data from content sources 108, 110. For example, content source 108 may store history data regarding web transactions with client 102 and provide the history data to content selection server 104. Content selection server 104 may analyze the history data associated with a user identifier to generate an interest category marketing (ICM) profile for the user identifier. An ICM profile may include one or more interest categories that represent topical categories in which a user may be interested. In some implementations, interest categories used by content selection server 104 may be predefined and may follow a hierarchical taxonomy. For example, the interest category of golf may be a subset of the interest category of sports (e.g., the interest category of golf may be represented as /Sports/Golf).

In some implementations, content selection server 104 may classify the history data as being long-term, short-term, or current history data, to identify an interest category as being a long-term, short-term, or current interest. For example, the webpage being visited by client 102 may be analyzed to determine one or more current interest categories for the user identifier associated with client 102. Short-term history may be any data from an intermediate time period between the current history and long-term history. For example, the short-term history may be from the previous hour or day. Long-term history data may be any data from a time period preceding the short-term time period. For example, long-term history data may be history data regarding actions performed between the previous day and one month prior. Content selection server 104 may use the current, short-term, and long-term interest categories to generate an ICM profile. In some cases, a weighting may be applied to an interest category based on its type and/or a potential strength of the interest category. For example, a current interest category may receive a greater weighting than a long-term interest category. In another example, an interest category identified from ten website visits may receive a greater weight than an interest category identified from a single website visit.

Content selection server 104 may select content to be provided with content from content sources 108, 110 to client 102. For example, content selection server 104 may select an advertisement to be placed on a webpage provided by content source 108 to client 102. In some implementations, content selection server 104 may be configured to allow a plurality of entities to compete for the ability to provide content to client 102. For example, various advertisers may compete in an auction conducted by content selection server 104 to select the content to be provided to client 102. Bids in a content auction conducted by content selection server 104 may be for a simple impression (i.e., the content is displayed to the user of client 102), a click-through (i.e., the user of client 102 clicks on the selected content), or a conversion (i.e., the user of client 102 clicks on the content and performs a desired action on the provider's website). In some implementations, content selection server 104 may generate an auction bid on behalf of an auction participant. In other words, the bid may be generated without further action by the participant. For example, an advertiser may provide a daily, weekly, or monthly budget to content selection server 104, as well as certain advertising goals. In response, content selection server 104 may generate bids on behalf of an advertiser to meet the advertiser's budgetary and advertising goals (e.g., number of impressions per day, clicks per day, etc.).

Content selection server 104 may be configured to allow a content provider to specify one or more rules used during the content selection process. Content selection server 104 may use the rule to select providers eligible to provide content to a particular user identifier (e.g., to select participants in an advertising auction, etc.). A rule may be based on one or more interest categories specified by the content provider. For example, a content provider may specify that their content is to be provided to users interested in golf or movies. If a hierarchical structure is used to classify interest categories, a content provider may specify a broader or narrower interest category. For example, the content provider may specify /Sports to provide content to any user identifier associated with any sports-related interest category (e.g., /Sports/Golf, /Sports/Football, etc.).

In some implementations, a rule used by content selection server 104 may be based in part on one or more identifier lists. In some cases, the identifier list may be generated by content selection server 104 by collecting and storing data regarding pixel tags placed on webpages provided by content sources 108, 110. Whenever a particular type of webpage is loaded (e.g., a shopping cart webpage, a product search webpage, an order confirmation webpage, etc.), a pixel tag on the webpage may cause client 102 to request an image from content selection server 104. In response, content selection server 104 may return a command to set a cookie on client 102 and an image that does not significantly affect the display of the webpage (e.g., a transparent image, a 1×1 pixel image, etc.). Content selection server 104 may then use the cookie data to generate an identifier list representative of users that performed a specific action (e.g., clicked on an advertisement, searched for a product, added a product to a shopping cart, made a purchase, etc.). A content provider that uses content selection server 104 may specify a rule that includes any number of identifier lists. For example, a content provider may participate in a content auction if a client identifier is in a list related to adding a product to a shopping cart (e.g., a list of cookies set via a shopping cart webpage) but not have a corresponding client identifier in a list related to making a purchase (e.g., a list of cookies set via an order confirmation webpage).

A custom rule used by content selection server 104 to determine eligible content providers during the content selection process may be represented as a Boolean expression. The expression may include any number of operators to perform logical operations on the components of the expression. Example operators include: AND, OR, and NOT. Other non-limiting examples of operators include: XOR, NAND, NOR, and any other form of logical operators. For example, a rule specified by a content provider may be of the form (AND list=L1, list=L2). Such a rule may be used by content selection server 104 to select the content provider as a potential source of content for user identifier associated with client identifiers found in both lists L1 and L2. In another example, a rule may be of the form (AND category=/Sports/Golf, list=L1). Content selection server 104 may use the rule to select the content provider as a potential source of content for an identifier in list L1 and associated with an ICM profile that includes the interest category of /Sports/Golf.

Figure 2:
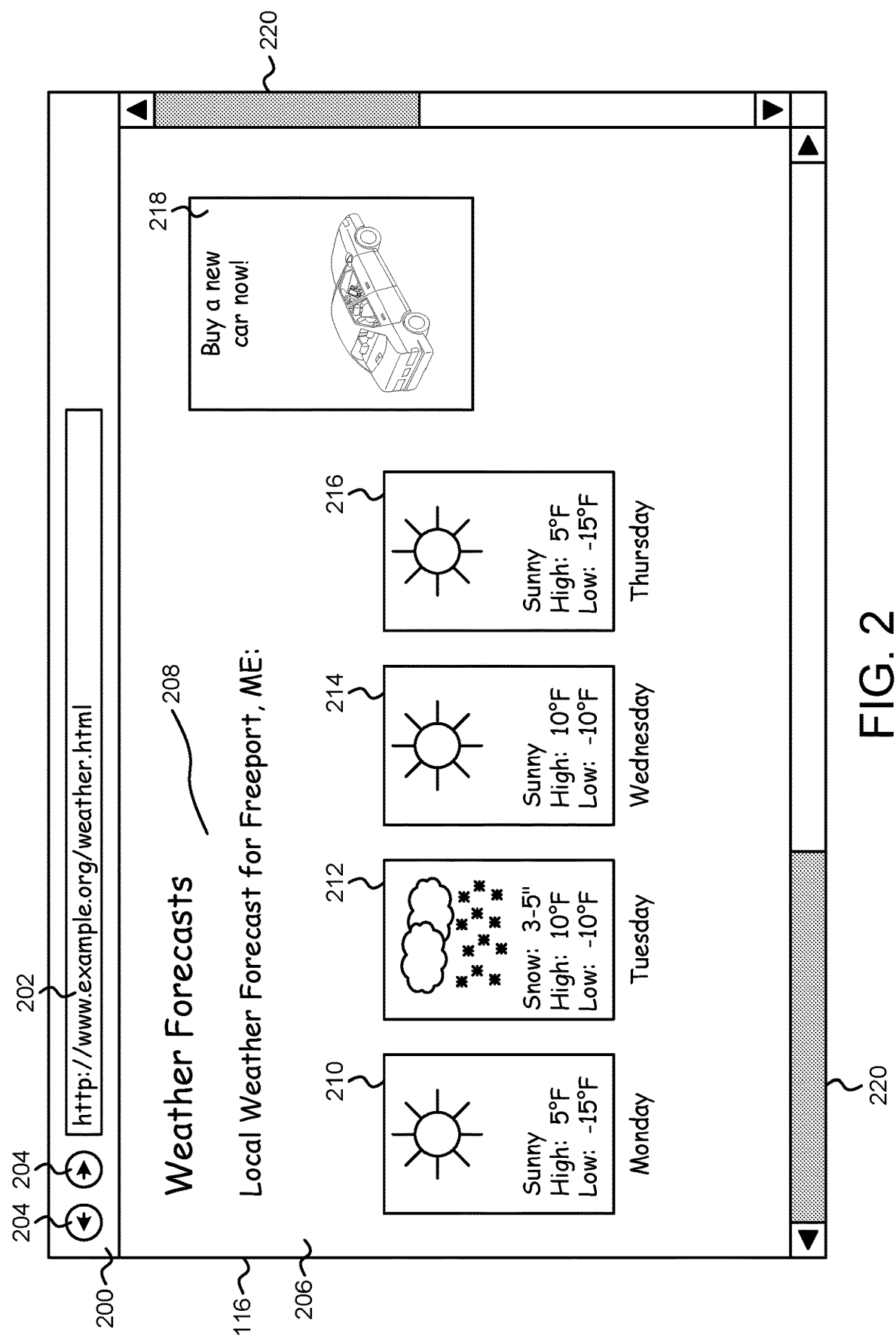
FIG. 2 is an illustration of an electronic display showing an example webpage.

Referring now to FIG. 2, an illustration is shown of electronic display 116 displaying an example webpage 206. Electronic display 116 is in electronic communication with processor 112 which causes visual indicia to be displayed on electronic display 116. As shown, processor 112 may execute a web browser 200 stored in memory 114 of client 102, to display indicia of content received by client 102 via network 106. In other implementations, another application executed by client 102 may incorporate some or all of the functionality described with regard to web browser 200 (e.g., a video game, a chat application, etc.).

Web browser 200 may operate by receiving input of a uniform resource locator (URL) via a field 202 from an input device (e.g., a pointing device, a keyboard, a touch screen, etc.). For example, the URL, http://www.example.org/weather.html, may be entered into field 202. Processor 112 may use the inputted URL to request data from a content source having a network address that corresponds to the entered URL. In response to the request, the content source may return webpage data and/or other data to client 102. Web browser 200 may analyze the returned data and cause visual indicia to be displayed by electronic display 116 based on the data.

In general, webpage data may include text, hyperlinks, layout information, and other data that may be used to provide the framework for the visual layout of webpage 206. In some implementations, webpage data may be one or more files of webpage code written in a markup language, such as the hypertext markup language (HTML), extensible HTML (XHTML), extensible markup language (XML), or any other markup language. For example, the webpage data in FIG. 2 may include a file, "weather.html" provided by the website, "www.example.org." The webpage data may include data that specifies where indicia appear on webpage 206, such as text 208. In some implementations, the webpage data may also include additional URL information used by web browser 200 to retrieve additional indicia displayed on webpage 206. For example, the file, "weather.html," may also include one or more instructions used by processor 112 to retrieve images 210-216 from their respective content sources.

Web browser 200 may include a number of navigational controls associated with webpage 206. For example, web browser 200 may be configured to navigate forward and backwards between webpages in response to receiving commands via inputs 204 (e.g., a back button, a forward button, etc.). Web browser 200 may also include one or more scroll bars 220, which can be used to display parts of webpage 206 that are currently off-screen. For example, webpage 206 may be formatted to be larger than the screen of electronic display 116. In such a case, the one or more scroll bars 220 may be used to change the vertical and/or horizontal position of webpage 206 on electronic display 116.

Webpage 206 may be devoted to one or more topics. For example, webpage 206 may be devoted to the local weather forecast for Freeport, Me. In some implementations, a content selection server, such as content selection server 104, may analyze the contents of webpage 206 to identify one or more topics. For example, content selection server 104 may analyze text 208 and/or images 210-216 to identify webpage 206 as being devoted to weather forecasts. In some implementations, webpage data for webpage 206 may include metadata that identifies a topic.

In various implementations, content selection server 104 may select some or all of the content presented on webpage 206. For example, content selection server 104 may select advertisement 218 to be included on webpage 206, based on a user identifier associated with client 102. In some implementations, one or more content tags may be embedded into the code of webpage 206 that defines a content field located at the position of advertisement 218. Another content tag may cause web browser 200 to request additional content from content selection server 104, when webpage 206 is loaded. Such a request may include one or more keywords, a client identifier for client 102, or other data used by content selection server 104 to select content to be provided to client 102. In response, content selection server 104 may select advertisement 218.

Advertisement 218 may be selected based in part on an interest category identified by analyzing history data associated with a client identifier for client 102. For example, assume that the user of web browser 200 researched various makes and models of automobiles. Data regarding the research may be analyzed by content selection server 104 to identify automobiles as a potential interest category. Advertisers for automobiles may then compete in an auction to determine which advertiser is able to provide an advertisement to client 102. Thus, advertisement 218 may be provided on webpage 206 based on a potential interest of the user of client 102 (e.g., automobiles), without regard to the actual topic of webpage 206 (e.g., a weather forecast).

In some implementations, advertisement 218 may also be selected based in part on one or more likelihood values generated by analyzing history data. For example, advertisement 218 may be selected based on a likelihood value indicative of the likelihood that the user of client 102 will click on advertisement 218 and/or make a purchase from the advertiser. In implementations in which an auction is conducted by content selection server 104, the one or more likelihood values may be used to generate bids on behalf of auction participants. For example, assume that a likelihood value indicates a high likelihood that the user of client 102 will click on advertisement 218 (e.g., to be redirected to the advertiser's website). In such a case, the bid generated on behalf of the advertiser may be generated such that the advertiser is the winner of the auction and advertisement 218 is selected by content selection server 104.

In some implementations, content selection server 104 may provide advertisement 218 directly to client 102. In other implementations, content selection server 104 may send a command to client 102 that causes client 102 to retrieve advertisement 218. For example, the command may cause client 102 to retrieve advertisement 218 from a local memory, if advertisement 218 is already stored in memory 114, or from a networked content source. In this way, any number of different pieces of content may be placed in the location of advertisement 218 on webpage 206. In other words, one user that visits webpage 206 may be presented with advertisement 218 and a second user that visits webpage 206 may be presented with different content. Other forms of content (e.g., an image, text, an audio file, a video file, etc.) may be selected by content selection server 104 for display with webpage 206 in a manner similar to that of advertisement 218. In further implementations, content selected by content selection server 104 may be displayed outside of webpage 206. For example, content selected by content selection server 104 may be displayed in a separate window or tab of web browser 200, may be presented via another software application (e.g., a text editor, a media player, etc.), or may be downloaded to client 102 for later use.

Figure 3:
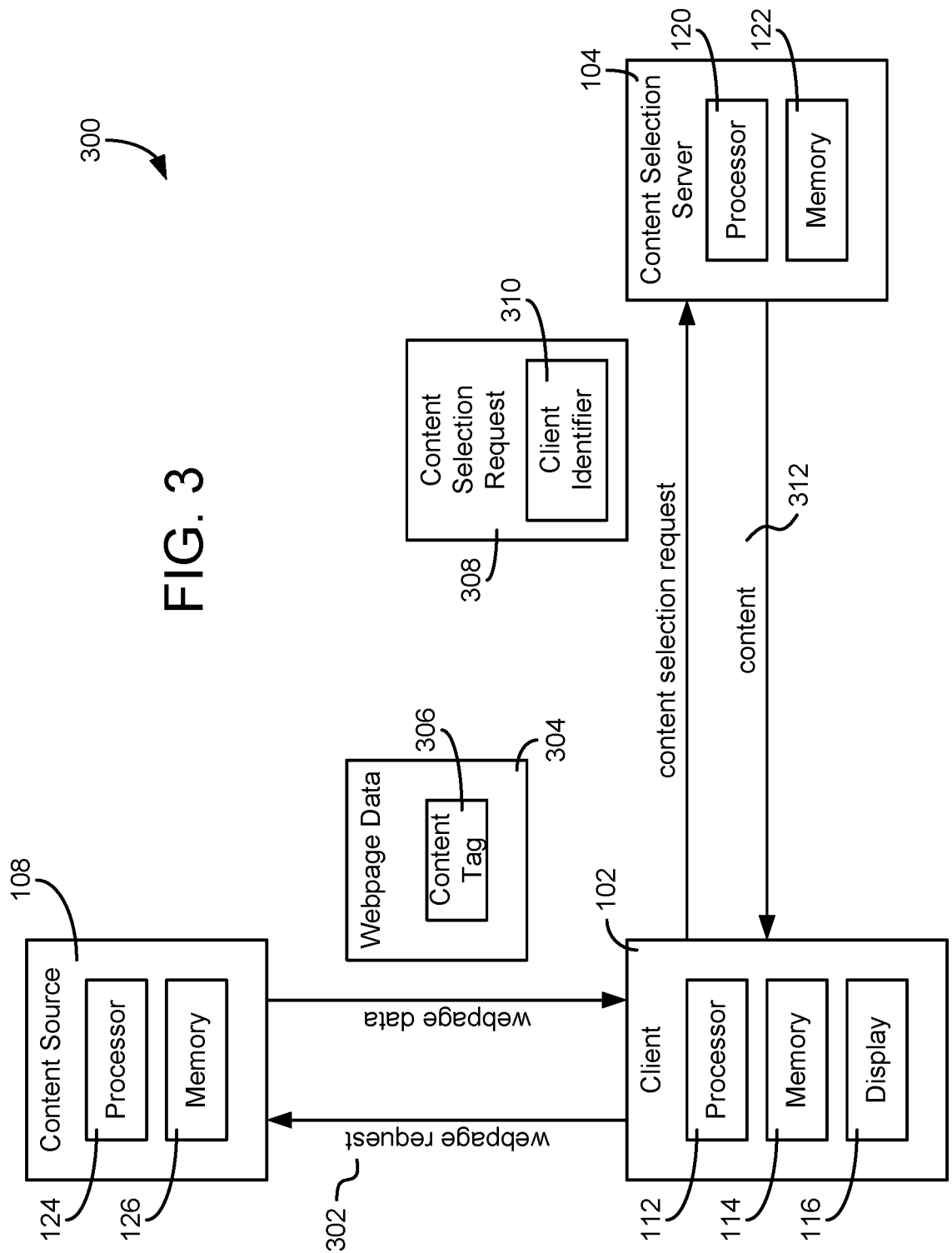
FIG. 3 is an example illustration of content being included with a webpage by a content selection server.

FIG. 3 is an example illustration of content 312 being selected by content selection server 104. As shown, client 102 may send a webpage request 302 to a content source via network 106, such as content source 108. For example, webpage request 302 may be a request that conforms to the hypertext transfer protocol (HTTP), such as the following:

ET /weather.html HTTP/1.1
Host: www.example.org

Such a request may include the name of the file to be retrieved, weather.html, as well as the network location of the file, www.example.org. In some cases, a network location may be an IP address or may be a domain name that resolves to an IP address of content source 108. In some implementations, a client identifier, such as a cookie associated with content source 108, may be included with webpage request 302 to identify client 102 to content source 108.

In response to receiving webpage request 302, content source 108 may return webpage data 304, such as the requested file, "weather.html." Webpage data 304 may be configured to cause client 102 to display a webpage on electronic display 116 when opened by a web browser application. In some cases, webpage data 304 may include code that causes client 102 to request additional files to be used as part of the displayed webpage. For example, webpage data 304 may include an HTML image tag of the form:

<img src="Monday_forecast.jpg">

Such code may cause client 102 to request the image file "Monday_forecast.jpg," from content source 108.

In some implementations, webpage data 304 may include content tag 306 configured to cause client 102 to retrieve an advertisement from content selection server 104. In some cases, content tag 306 may be an HTML image tag that includes the network location of content selection server 104. In other cases, content tag 306 may be implemented using a client-side scripting language, such as JavaScript. For example, content tag 306 may be of the form:

<script type='text/javascrip'>
AdNetwork_RetrieveAd("argument")
</script> where AdNetwork_RetrieveAd is a script function that causes client 102 to send a content selection request 308 to content selection server 104. In various implementations, the argument of the script function may include the network address of content selection server 104, the referring webpage, and/or additional information that may be used by content selection server 104 to select content to be included with the webpage.

Content selection request 308 may include a client identifier 310, used by content selection server 104 to identify client 102. In various implementations, client identifier 310 may be an HTTP cookie previously set by content selection server 104 on client 102, the IP address of client 102, a unique device serial for client 102, other forms of identification information, or combinations thereof. For example, content selection server 104 may set a cookie that includes a unique string of characters on client 102 when content is first requested by client 102 from content selection server 104. Such a cookie may be included in subsequent content selection requests sent to content selection server 104 by client 102.

In some implementations, client identifier 310 may be used by content selection server 104 to store history data for client 102, with the permission of the user of client 102. For example, content selection request 308 may include data relating to which webpage was requested by client 102, when the webpage was requested, and/or other history data. Whenever client 102 visits a webpage that allows content selection server 104 to select content to appear in conjunction with the webpage, content selection server 104 may receive and store history data for client 102. In this way, content selection server 104 is able to reconstruct the online history of client 102 regarding webpages that utilize content selection server 104. In some implementations, content selection server 104 may also receive history data for client 102 from content sources that do not use its content selection services. For example, a website that does not use content selected by content selection server 104 may nonetheless provide information about client 102 visiting the website to content selection server 104, if the user has opted in to receiving relevant content selected by content selection server 104.

In some cases, client identifier 310 may be sent to content selection server 104 when a particular online event occurs. For example, webpage data 304 may include a tag that causes client 102 to send client identifier 310 to content selection server 104 when a displayed advertisement is clicked by the user of client 102. Client identifier 310 may also be used to record information after client 102 is redirected to another webpage. For example, client 102 may be redirected to an advertiser's website if the user selects a displayed advertisement. In such a case, client identifier 310 may also be used to record which actions were performed on the advertiser's website. For example, client identifier 310 may be sent to content selection server 104 as the user of client 102 navigates within the advertiser's website. In this way, data regarding whether the user searched for a product, added a product to a shopping cart, completed a purchase on the advertiser's website, etc., may also be recorded by content selection server 104.

Content selection server 104 may analyze history data associated with client identifier 310 to identify one or more interest categories and to model the behavior of the user of client 102. In various implementations content selection server 104 may utilize a machine learning model, such as a logistic regression model, to generate one or more likelihood values (e.g., the likelihood one or more events occurring). For example, content selection server 104 may generate a likelihood value indicative of the likelihood that the user of client 102 will click on a particular type of advertisement (e.g., a predicted click through rate), if selected by content selection server 104. In some implementations, content selection server 104 may conduct an auction in response to receiving content selection request 308. Bids in the auction may be based in part on a likelihood value, in some implementations. For example, a bid on behalf of an advertiser may be higher or lower based in part on how likely the user of client 102 is to interact with an advertisement from the advertiser. Content selection server 104 may use the results of the auction to select content 312 from the winner and provide content 312 to client 102.

Figure 4:
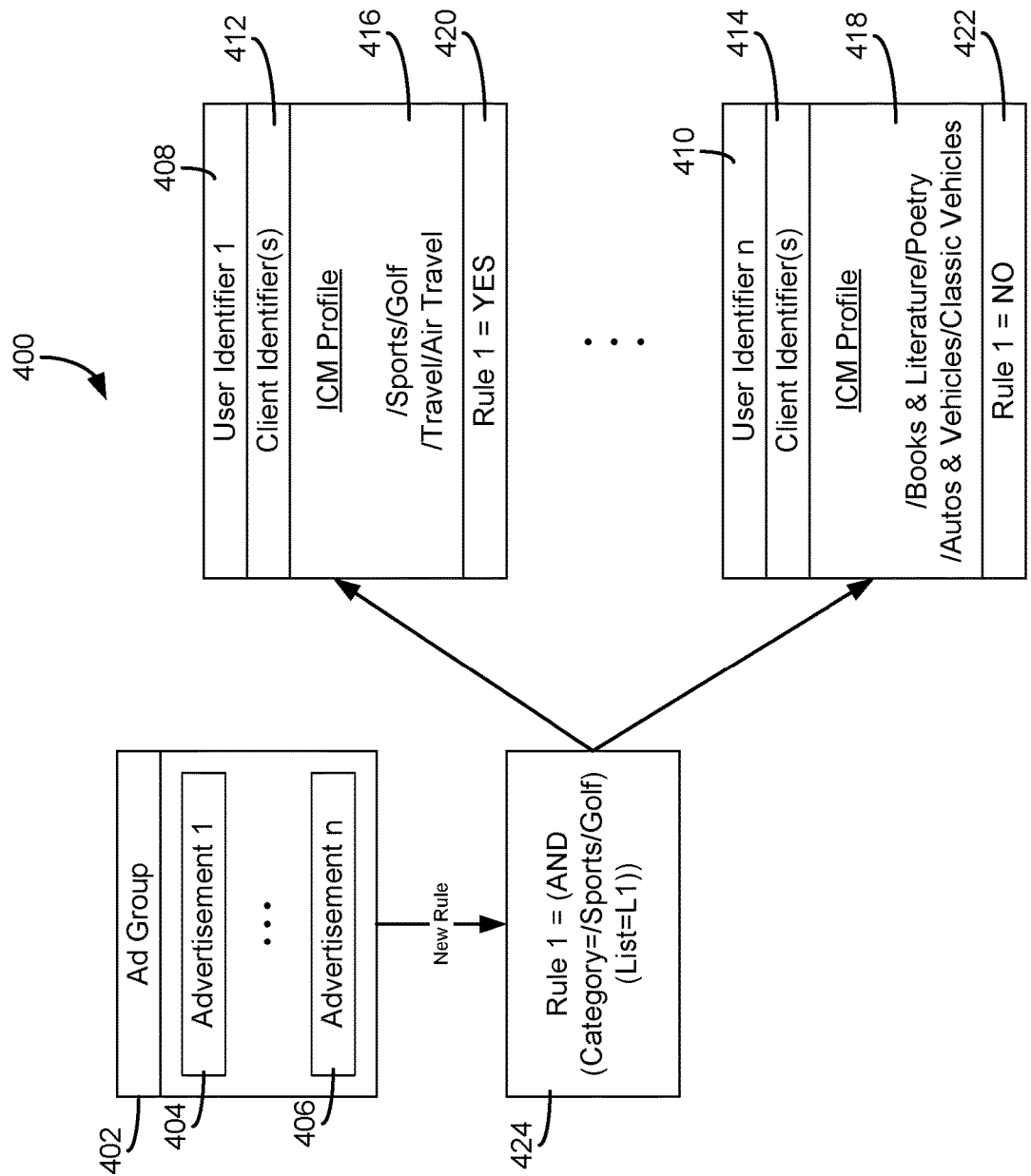
FIG. 4 is an example illustration of a content selection rule being evaluated.

FIG. 4 is an example illustration 400 of a content selection rule 424 being evaluated. As shown, rule 424 may be specified by a content provider that uses a content selection service to select content for a client device. For example, an advertiser may specify rule 424 to content selection server 104 to provide content to one or more user identifiers having certain characteristics. Rule 424 may include any number of interest categories and/or identifier lists separated by logical operators. In the example shown, rule 424 includes the interest category of /Sports/Golf and the identifier list L1. Rule 424 is also shown to include the logical operator, AND. For example, list L1 may include client identifiers associated with making a purchase at the advertiser's website. In other words, rule 424 may be specified by the advertiser to provide content to a user that made a purchase at the advertiser's website and is also interested in golf.

The advertiser may utilize content selection server 104 to associate rule 424 with a set of content, such as ad group 402. Ad group 402 may include any number of advertisements, such as a first advertisement 404 through an nth advertisement 406. The content selection service may select from among advertisements 404-406 based on evaluation of rule 424 and/or additional parameters. For example, the content selection service may analyze performance metrics (e.g., a click-through rate, a conversion rate, etc.) regarding advertisements 404-406 to select an advertisement from ad group 402. In some implementations, the content selection service may select one of advertisements 404-406 to achieve a marketing goal set by the advertiser. In other implementations, the content selection service may select an advertisement from ad group 402 randomly, based on the time of day, or based on the current date (e.g., advertisement 404 is selected on Mondays and advertisement 406 is selected on Saturdays).

In various implementations, the content selection service may evaluate a set of user identifiers 408-410 (i.e., a first user identifier through nth user identifier). User identifiers 408-410 may be associated with any number of client identifiers 412, 414, respectively. For example, client identifiers 412 may include one or more cookies set on any number of devices associated with user identifier 408. In other implementations, user identifier 408 may itself be a client identifier. Each of user identifiers 408-410 may be associated with ICM profiles 416-418, respectively. ICM profiles 416-418 may be determined by the content selection service by analyzing history data indicative of webpage visits and similar online actions (e.g., actions performed on a retailer's website, clicking on an advertisement, etc.). The content selection service may identify topical categories regarding the analyzed history data to determine interest categories to be included in ICM profiles 416-418. For example, user identifier 408 may be associated with a number of visits to webpages devoted to golf and to airline travel. In such a case, the interest categories of /Sports/Golf and /Travel/Air Travel may be included in ICM profile 416 associated with user identifier 408. Similarly, the interest categories of /Books & Literature/Poetry and /Autos &

Vehicles/Classic Vehicles may be included in ICM profile 418 associated with user identifier 410.

ICM profiles 416-418 may be generated using history data from any number of different time periods. For example, long-term, short-term, and current history data may be used to generate ICM profiles 416-418. Some or all of ICM profiles 416-418 may be generated periodically or in real-time (e.g., in response to a change in the history data associated with user identifiers 408-410). For example, ICM profile 416 may be updated to include the interest category of /Shopping/Gift Cards, if the history data associated with user identifier 408 indicates a recent online search for gift cards. According to various implementations, a certain number of interest categories may be allocated to ICM profiles 416-418 based on whether an interest category is a long-term, short-term, or current interest. Thus, the allocated long-term, short-term, and/or current interest categories in ICM profiles 416-418 may be updated at different times. For example, long-term interests may be determined on a daily basis (e.g., as a nightly batch job), while short-term and/or current interests may be determined in real time.

In some implementations, rule 424 may be evaluated with regard to user identifiers 408-410. Flags 420-422 (e.g., logical bits, database table entries, etc.) may be set or created, based on whether client identifiers 412-414 satisfy rule 424. For example, user identifiers 408-410 may be evaluated to determine whether any of client identifiers 416-418 are included in identifier list L1. Similarly, ICM profiles 416-418 may be evaluated to determine whether the interest category of /Sports/Golf is included in any of ICM profiles 416-418. If both conditions are met, the content selection service may set the corresponding flag to be true. As shown, flag 420 may be set to be true, since user identifier 408 satisfies rule 424. Similarly, flag 422 may be set to be false, since user identifier 410 does not satisfy rule 424. Rule 424 may be reevaluated for some or all of user identifiers 408-410 whenever IMC profiles 416-420 are updated or at any other time (e.g., on a daily basis).

Figure 5:
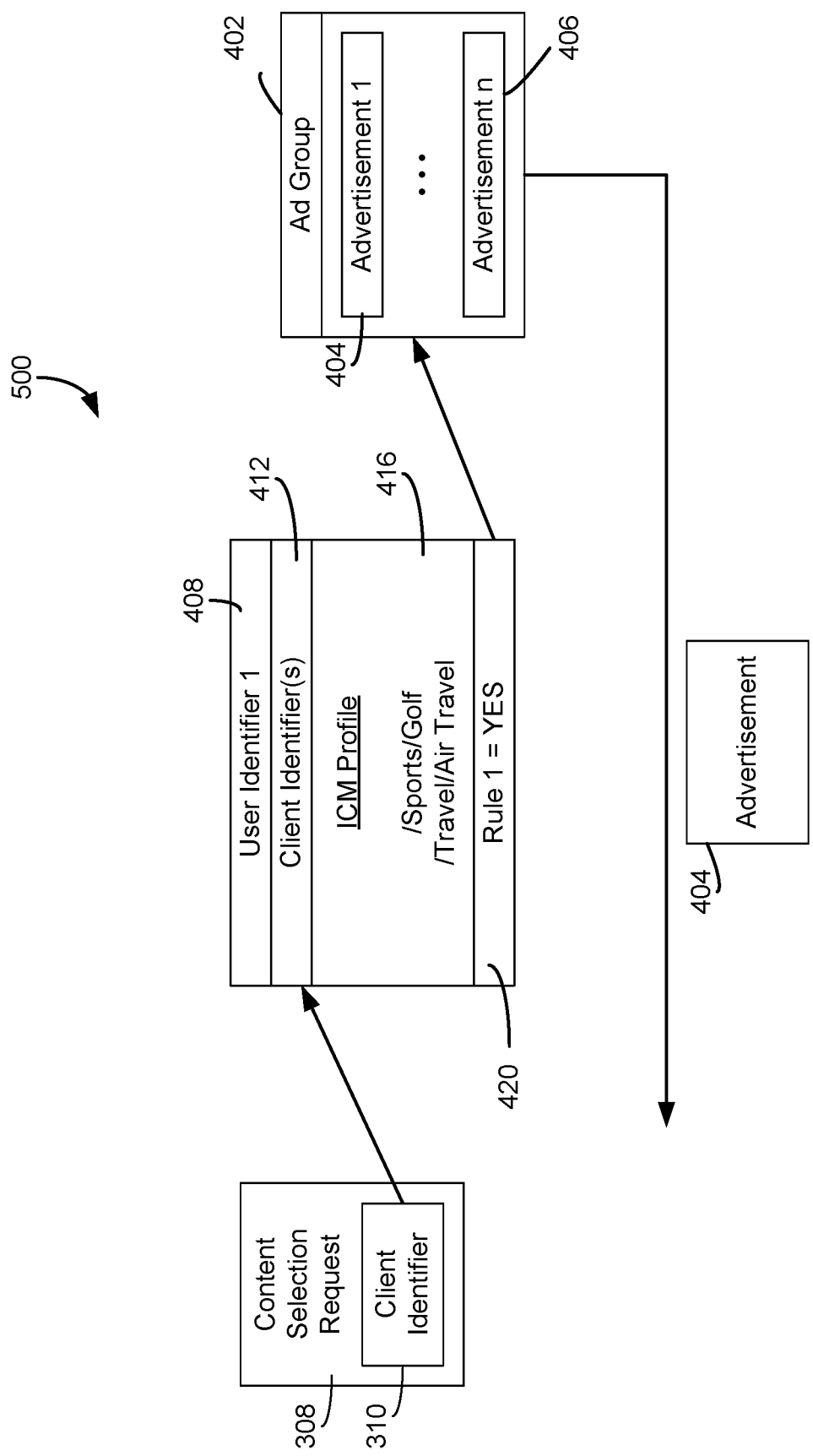
FIG. 5 is an example illustration of content being selected.

Referring now to FIG. 5, an example illustration 500 of content being selected by a content selection service is shown, according to some implementations. For example, a content selection service provided by content selection server 104 shown in FIG. 3 may select advertisement 404 for display by client 102. The content selection service may receive a content selection request, such as content selection request 308 (i.e., a request for the content selection service to select content for presentation by the client device).

Content selection request 308 may include, or may be provided in conjunction with, client identifier 310. For example, client identifier 310 may be a cookie set on client 102 sent to content selection server 104 with content selection request 308. The content selection service may use client identifier 308 to retrieve data associated with client identifier 308. In various implementations, content selection server 104 may determine that client identifier 310 is included in client identifiers 412 associated with user identifier 408. In other implementations, user identifier 408 may itself be client identifier 310 and used by content selection server 104 to retrieve data, such as ICM profile 416 and/or flag 420 associated with user identifier 408.

In some implementations, flag 420 may be evaluated to determine whether the advertiser that specified rule 424 is eligible to provide content to client 102 during the content selection process. In some cases, an advertiser or other user of the content selection service may be included as a participant in an auction based on a determination that the entity has eligible content. For example, the advertiser that specified ad group 402 may be a participant in an auction based on the value of flag 420 (i.e., based on whether user identifier 408 satisfies the criteria specified by the advertiser). Bids on behalf of the auction participants may be generated automatically by the content selection service, in some implementations. For example, a bid on behalf of the advertiser having ad group 402 may be generated automatically based on a specified budget and/or marketing goals of the advertiser. An advertisement, such as advertisement 404, may be selected from ad group 402 based on the results of the auction. For example, if the advertiser is determined to be the winner of the auction, advertisement 404 may be selected from among ad group 402 for display by client 102. Advertisement 404 itself, or an instruction to retrieve advertisement 404, may be returned to client 102 according to various implementations.

Figure 6:
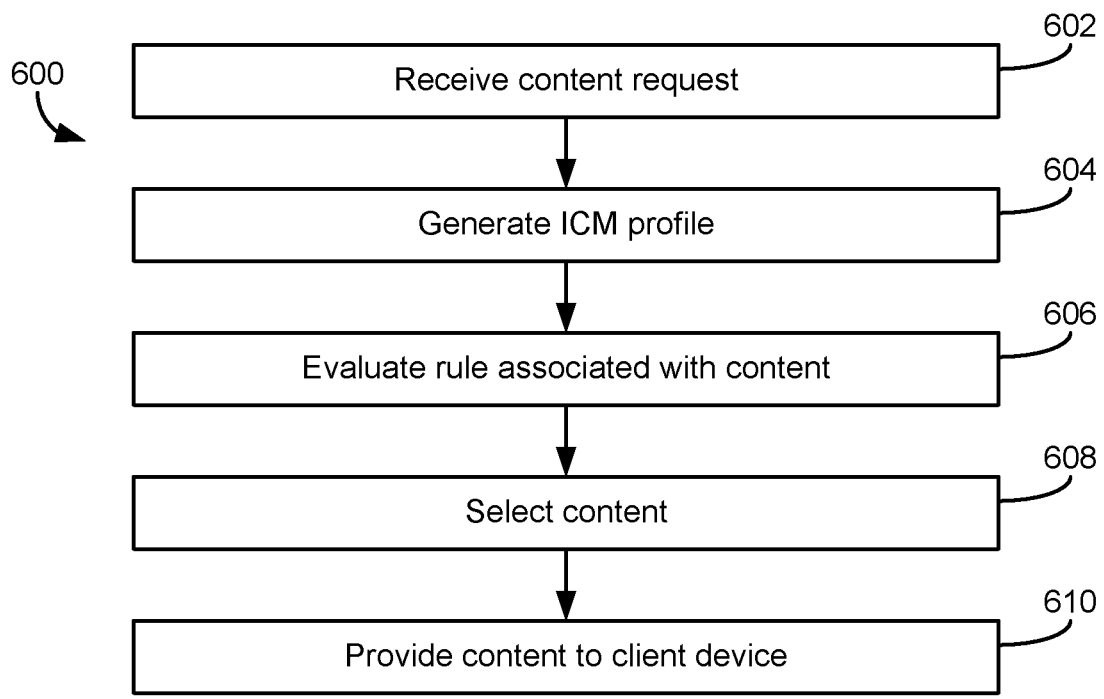
FIG. 6 is an example flow diagram of a process for providing online content.

Referring now to FIG. 6, an example flow diagram of a process 600 for providing online content is shown. Process 600 may be implemented by one or more computing devices that provide a content selection service. For example, process 600 may be implemented by content selection server 104, shown in FIG. 1. In various implementations, a user may opt in to receiving content selected for the user via process 600. For example, a user may opt in to allowing history data to be stored regarding the user's online history (e.g., information regarding the websites visited by the user, whether the user interacted with certain content, whether the user made an online purchase, etc.).

In general, process 600 evaluates a custom selection rule with a focus on the content to be selected (e.g., advertisement group, an individual advertisement, etc.). Doing so may enable rules to be evaluated in real-time, such as whenever a content selection request is received or whenever an ICM profile is updated. For example, the implementations shown in FIGS. 4-5 evaluate a custom selection rule with a focus on user identifiers, which may require greater computing resources than focusing the rule evaluation on potential content instead. In addition, the resource requirements in a user identifier-focused implementation may prohibit the evaluation of high-level interest categories used within a rule. For example, the interest category of /Sports may include /Sports/Baseball, /Sports/Golf, and /Sports/Football. Therefore, the presence of the three different interest categories in an ICM profile must be determined, if /Sports is specified within a custom rule. In some cases, a user identifier-focused implementation may not be configured to support high-level interest categories in a custom rule, due to the additional resources required to evaluate the logical statement. In a content-focused implementation, however, high-level interest categories may be utilize within a custom rule, since the computing resources required for a content-focused implementation may be less than a user identifier-focused implementation.

Process 600 may include receiving a content selection request (block 602). A content selection request may be received by a content selection service from a client device or another content source, in various implementations. For example, a content tag embedded in a webpage may cause a client device to send a content selection request to the content selection service. The content selection request may include, or may be associated with, a client identifier. The client identifier may be any identifier that may be used by the content selection service to represent the client. For example, the client identifier may be a cookie, a network address, a serial number, or similar data. In various implementations, the client identifier may be associated with a user identifier or may itself be used as a user identifier by the content selection service.

Process 600 includes generating an ICM profile (block 604). History data associated with a received client identifier as part of a content selection request may be analyzed by the content selection service. In some implementations, the analyzed history data may correspond to data generated during certain time periods. For example, history data indicative of the most recently visited webpage may be used to determine one or more current interest categories for the ICM profile. In another example, history data generated in the past four hours may be analyzed to determine one or more short-term interest categories. A generated ICM profile may include any number of interest categories. For example, an ICM profile may be limited to a total of ten interest categories or may be unlimited. In some cases, interest categories may be included in the ICM profile based on weighting values. Such weighting values may be based on the strength of a user's potential interest in the category, whether the interest is a current, short-term, or long-term interest, and other factors.

Process 600 includes evaluating a selection rule associated with content (block 606). In some implementations, content available for selection by the content selection service may be evaluated in response to receiving a content selection request. As part of the evaluation, a selection rule specified by the content provider may also be evaluated. Such a selection rule may include any number logical expressions regarding interest categories and/or identifier lists. For example, an advertiser may create a custom selection rule that specifies that advertisements from the advertiser are to be provided to user identifiers associated with the interest categories of /Sports/Polo or /Sports/Baseball. Rather than evaluating the rule with respect to each user identifier when the rule is created, the rule may be associated with the advertisement and evaluated as needed when a content selection request is received.

In some implementations, a custom selection rule may be broken down to its constituent logical expressions. The constituent logical expressions may then be evaluated separately. In some cases, a selection rule that includes logical expressions regarding identifier lists and interest categories may be broken down into the two respective selection types for evaluation (e.g., interest category expressions are evaluated separately from identifier list expressions). A selection rule that includes different interest category expressions may also be broken down into the different interest category expressions. For example, a rule may be defined as (AND interest category=/Sports/Polo, interest category=Sports/Fishing). In such a case, the interest category criteria may each be associated with an advertisement or ad group and evaluated separately, when a content selection request is received.

Process 600 includes selecting content (block 608). Content may be selected based on any number of factors. In some implementations, a custom rule may be evaluated to determine whether its associated content is eligible for selection. For example, a custom rule associated with an ad group may be evaluated to determine whether an advertisement in the ad group is eligible for selection. In further implementations, performance metrics associated with the ad group and/or individual advertisements may be used to determine eligibility for selection. For example, advertisements having low performance metrics (e.g., click-through rates, conversion rates, etc.), may be deemed ineligible for selection, regardless of any associated custom selection rules. In some implementations, content eligible for selection may be selected based on the results of an auction. For example, an auction may be conducted among content providers of content deemed eligible for selection, to select the content.

Process 600 includes providing the selected content to a client device (block 610). In some implementations, the selected content may be provided by a device of the content selection service. For example, content selection server 104 may provide a selected advertisement to client 102. In other implementations, the content selected by the content selection service may be provided by another content source. For example, the content selection service may provide an indication of the selection to another electronic device, which then serves the selected content.

Figure 7:
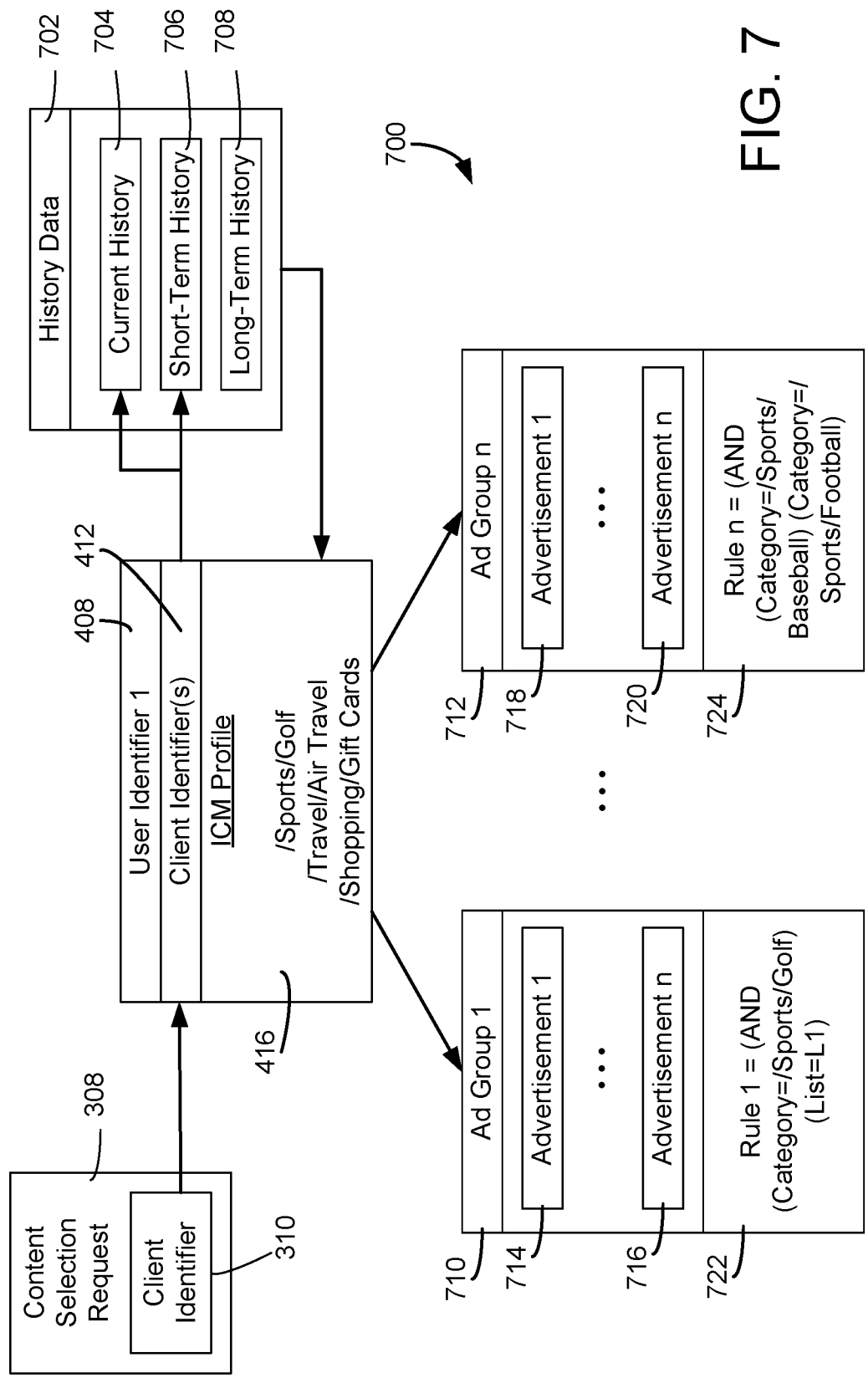
FIG. 7 is an example illustration of a content selection request being evaluated.

Referring now to FIG. 7, an example illustration 700 of a content selection request being evaluated is shown. In illustration 700, content selection request 308 may be evaluated using a strategy that focuses on rule evaluation on the content side. In contrast to implementations that focus on applying a custom rule to user identifiers, the implementation shown in illustration 700 evaluates content in parallel, in response to receiving a content selection request. In other words, rather than flagging user identifiers that satisfy the criteria of a given rule when the rule is created, the rule may be evaluated instead when a content selection request is received. Since the number of ad groups may be fewer than the total number of user identifiers, evaluation of custom rules on the advertisement side may use less computing resources than evaluating the rules with regard to each user identifier.

In response to receiving client identifier 310 as part of content selection request 308, the content selection service may identify client identifier 310 as being associated with user identifier 408. For example, client identifier 310 may be matched to a client identifier in client identifiers 412. Based on a match, data associated with user identifier 408 may be retrieved and evaluated. In other implementations, user identifier 408 may itself be client identifier 308.

In various implementations, ICM profile 416 may be generated in response to receiving content selection request 308. For example, history data 702 associated with user identifier 408 may be evaluated by the content selection service to identify one or more interest categories for inclusion in ICM profile 416. History data 702 may include history data generated during different periods of time. For example, history data 702 may include current history 704 (e.g., data regarding the most recently visited webpage), short-term history 706 (e.g., data regarding webpages visited within the last several hours or day), and long-term history 708 (e.g., data regarding webpages visited more than one day prior). Some or all of history data 702 may be evaluated in response to receiving content selection request 308. For example, current history data 704 and/or short-term history data 706 may be evaluated to identify current and/or short-term interest categories for ICM profile 416 in response to receiving content selection request 308, while long-term history data 708 may be evaluated on a daily basis to identify long-term interest categories. As shown, assume that current history data 704 indicates that a webpage devoted to gift cards was visited. The content selection service may use this data to identify the interest category of /Shopping/Gift Cards and include the category in ICM profile 416. In other words, a custom selection rule may be evaluated with respect to current, short-term, and/or long term interest categories in ICM profile 416.

Any number of ad groups may be evaluated for eligibility to provide content in response to content selection request 308. For example, a first ad group 710 through nth ad group 712 may be evaluated. Each of ad groups 710-712 may include one or more advertisements, such as advertisements 714-716 and advertisements 718-720, respectively. One or more of ad groups 710-712 may have an associated custom rule. For example, rules 722-724 may be associated with their respective ad groups 710-712. Rules 722-724 may include any number of logical criteria regarding interest categories and/or identifier lists. For example, rule 722 may combine both an interest category and an identifier list as criteria using a logical AND operator, whereas rule 724 may combine two interest categories using a logical AND operator. Each criteria may be evaluated separately, in some implementations. For example, rule 724 may be treated by the content selection service as two separate criteria for selection: the interest category of /Sports/Baseball and the interest category of /Sports/Football. Thus, the entirety of rule 724 may not be evaluated, if one of the criteria is unmet. For example, if ICM profile 416 does not contain /Sports/Baseball, ICM profile 416 may not be evaluated to determine whether it contains the interest category of /Sports/Football.

Rules 722-724 may be evaluated to determine whether any of advertisements 714-720 in ad groups 710-712 are eligible to be selected for display by client 102. For example, ad group 710 may be determined to be eligible to provide content to client 102, based on evaluation of rule 722. In other words, the interest category of /Sports/Golf denoted in rule 722 may be compared to the interest categories in ICM profile 416 and the identifiers in list L1 may be compared to client identifier 412. Based on the comparisons, ad group 710 may be determined to be a potential source of the selected content. In some implementations, only some of rules 722-724 may be evaluated, based on additional characteristics associated with ad groups 710-712. For example, assume that the advertiser of ad group 712 has reached a daily budgetary limit. In such a case, rule 722 may be excluded from further evaluation with respect to user identifier 408. In one implementation, ad groups 710-712 may be evaluated in parallel. For example, rule 722 and rule 724 may be evaluated at the same time.

In some implementations, an advertiser may be selected for participation in an auction, based on the evaluation of rules 722-724. For example, the advertiser that specified rule 722 may be included in a content auction, based on a match between rule 722 and the data associated with user identifier 408. If the advertiser is then determined to be the winner of the auction, one of advertisements 714-720 may be returned to client 102 in reply to content selection request 308. In some implementations, an advertisement may be selected from an eligible ad group randomly or based on additional criteria, such as time of day, performance metrics for the advertisement, or similar criteria. The selected advertisement may then be displayed by client 102 as part of a webpage, in a pop-up window, or within another running application (e.g., a game, a video player, etc.).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A computerized method for providing content comprising:
identifying multiple different users that each performed actions at an advertiser's website;
creating multiple different lists of multiple different identifiers, wherein:
the multiple different lists includes at least (i) a first list that (i) includes identifiers of users that performed a first specific action at the advertiser's website, and (ii) is generated by pixel tags placed on a first webpage of the advertiser's website, and (ii) a second list that (i) includes identifiers of users that performed a second specific action at the advertiser's website, and (ii) is generated by pixel tags placed on a second webpage of the advertiser's website;
the first specific action differs from the second specific action;
the second specific action becomes performable at the advertiser's website after performing the first specific action; and
the multiple different identifiers each respectively identify one of the multiple different users;
analyzing, by a processing circuit, history data for each of the identified multiple different users, the history data being indicative of content presented to the multiple different users by content sources other than the advertiser's website;
determining, by the processing circuit, one or more interest categories for each of the multiple different users based on the history data;
identifying, by the processing circuit and from a plurality of custom selection rules, a custom selection rule specific to a given content item and generated from data provided by a content provider of the content item, the custom selection rule specifying that the content item is to be distributed to any of the multiple different users that (i) are represented by an identifier in the first list of multiple different identifiers (ii) are not represented by an identifier in the second list of multiple different identifiers, and also (iii) are determined to be interested in a given interest category;
receiving, at the processing circuit, a plurality of requests for content; and
responding to the plurality of requests based on the custom selection rule, including:
distributing the given content item in response to requests for users that (i) are represented by an identifier that is included in the first list of multiple different identifiers and (ii) are not represented by an identifier that is included in the second list of multiple different identifiers when a match exists between the one or more interest categories determined for a given user represented by the identifier and the given interest category; and
preventing distribution of the given content item in response to requests for users that are not represented by an identifier that is included in the first list of multiple different identifiers.

2. The method of claim 1, wherein at least one list in the multiple different lists comprises a set of one or more identifiers associated with a type of online action.

3. The method of claim 2, wherein the type of online action corresponds to at least one of visiting a particular website, adding an item to an online shopping cart, or making an online purchase, and wherein the first specific action is adding an item to an online shopping cart and the second specific action is purchasing the item added to the online shopping cart.

4. The method of claim 1, wherein the identified custom selection rule is a Boolean expression specified by the content provider.

5. The method of claim 1, wherein the given interest category of the identified custom selection rule is a high-level interest category of an interest category taxonomy, and the method further comprising determining, by the processing circuit, based on an evaluation of the identified custom selection rule, that the identifier is not identified as having an interest in a subcategory of the interest category of the custom selection rule.

6. The method of claim 1, wherein the history data comprises current and short-term history data, the current and short-term history data being analyzed to identify a current or short-term interest category in response to receiving a content selection request, and wherein the custom selection rule is evaluated in response to the current or short-term interest category being identified.

7. The method of claim 1, wherein the content is selected based in part on a predicted click through rate for the content.

8. The method of claim 1, further comprising:
identifying, responsive to an update schedule or a change in the one or more interest categories of the identifier, the custom selection rule from the plurality of custom selection rules; and
determining, based on a second evaluation of the custom selection rule performed responsive to identifying the custom selection rule responsive to the update schedule or a change in the one or more interest categories of the identifier, that the content item corresponding to the custom selection rule is eligible for selection for a device identified by the identifier.

9. The method of claim 1, further comprising:
evaluating only a portion of the custom selection rule based in part on a determination that the interest category in a custom selection rule is not associated with the one or more interest categories of the identifier.

10. A system for providing online content comprising a processing circuit operable to:
identify multiple different users that each performed actions at an advertiser's website;
create multiple different lists of multiple different identifiers, wherein:
the multiple different lists includes at least (i) a first list that (i) includes identifiers of users that performed a first specific action at the advertiser's website, and (ii) is generated by pixel tags placed on a first webpage of the advertiser's website, and (ii) a second list that (i) includes identifiers of users that performed a second specific action at the advertiser's website, and (ii) is generated by pixel tags placed on a second webpage of the advertiser's website;
the first specific action differs from the second specific action;
the second specific action becomes performable at the advertiser's website after performing the first specific action; and
the multiple different identifiers each respectively identify one of the multiple different users;
analyze, by a processing circuit, history data for each of the identified multiple different users, the history data being indicative of content presented to the multiple different users by content sources other than the advertiser's website;
determine, by the processing circuit, one or more interest categories for each of the multiple different users based on the history data;
identify, by the processing circuit and from a plurality of custom selection rules, a custom selection rule specific to a given content item and generated from data provided by a content provider of the content item, the custom selection rule specifying that the content item is to be distributed to any of the multiple different users that i) are represented by an identifier in the first list of multiple different identifiers (ii) are not represented by an identifier in the second list of multiple different identifiers, and also (iii) are determined to be interested in a given interest category;
receive, at the processing circuit, a plurality of requests for content; and
respond to the plurality of requests based on the custom selection rule, including:
distribute the given content item in response to requests for users that (i) are represented by an identifier that is included in the first list of multiple different identifiers and (ii) are not represented by an identifier that is included in the second third list of multiple different identifiers when a match exists between the one or more interest categories determined for a given user represented by the identifier and the given interest category; and
prevent distribution of the given content item in response to requests for users that are not represented by an identifier that is included in the first list of multiple different identifiers.

11. The system of claim 10, wherein at least one list in the multiple different lists comprises a set of one or more identifiers associated with a type of online action.

12. The system of claim 11, wherein the type of online action corresponds to at least one of visiting a particular website, adding an item to an online shopping cart, or making an online purchase, and wherein the first specific action is adding an item to an online shopping cart and the second specific action is purchasing the item added to the online shopping cart.

13. The system of claim 10, wherein the identified custom selection rule is a Boolean expression specified by the content provider.

14. The system of claim 10, wherein the interest category of the identified custom selection rule is a high-level interest category of an interest category taxonomy, and wherein the processing circuit is further operable to determine, based on an evaluation of the identified custom selection rule, that the identifier is not identified as having an interest in a subcategory of the interest category of the custom selection rule.

15. The system of claim 10, wherein the history data comprises current and short-term history data, the current and short-term history data being analyzed to identify a current or short-term interest category in response to receiving a content selection request, and wherein the custom selection rule is evaluated in response to the current or short-term interest category being identified.

16. The system of claim 10, wherein the content is selected based in part on a predicted click through rate for the content.

17. The system of claim 10, wherein the processing circuit is further operable to:
identify, responsive to an update schedule or a change in the one or more interest categories of the identifier, the custom selection rule from the plurality of custom selection rules; and
determine, based on a second evaluation of the custom selection rule performed responsive to identifying the custom selection rule responsive to the update schedule or a change in the one or more interest categories of the identifier, that the content item corresponding to the custom selection rule is eligible for selection for a device identified by the identifier.

18. The system of claim 10, wherein the processing circuit is further operable to:
evaluate only a portion of the custom selection rule based in part on a determination that the interest category in a custom selection rule is not associated with the one or more interest categories of the identifier.

19. A computer-readable storage medium having machine instructions stored therein, the instructions being executable by a processor to cause the processor to perform operations, the operations:
identifying multiple different users that each performed actions at an advertiser's website;
creating multiple different lists of multiple different identifiers, wherein:
the multiple different lists includes at (i) a first list that (i) includes identifiers of users that performed a first specific action at the advertiser's website, and (ii) is generated by pixel tags placed on a first webpage of the advertiser's website, and (ii) a second list that (i) includes identifiers of users that performed a second specific action at the advertiser's website, and (ii) is generated by pixel tags placed on a second webpage of the advertiser's website;
the first specific action differs from the second specific action;
the second specific action becomes performable at the advertiser's website after performing the first specific action; and
the multiple different identifiers each respectively identify one of the multiple different users;
analyzing, by a processing circuit, history data for each of the identified multiple different users, the history data being indicative of content presented to the multiple different users by content sources other than the advertiser's website;
determining, by the processing circuit, one or more interest categories for each of the multiple different users based on the history data;
identifying, by the processing circuit and from a plurality of custom selection rules, a custom selection rule specific to a given content item and generated from data provided by a content provider of the content item, the custom selection rule specifying that the content item is to be distributed to any of the multiple different users that (i) are represented by an identifier in the first list of multiple different identifiers (ii) are not represented by an identifier in the second list of multiple different identifiers, and also (iii) are determined to be interested in a given interest category;
receiving, at the processing circuit, a plurality of requests for content; and
responding to the plurality of requests based on the custom selection rule, including:
distributing the given content item in response to requests for users that (i) are represented by an identifier that is included in the first list of multiple different identifiers and (ii) are not represented by an identifier that is included in the second list of multiple different identifiers when a match exists between the one or more interest categories determined for a given user represented by the identifier and the given interest category; and preventing distribution of the given content item in response to requests for users that are not represented by an identifier that is included in the first list of multiple different identifiers.

20. The computer-readable storage medium of claim 19, wherein at least one list in the multiple different lists comprises a set of one or more identifiers associated with a type of online action.

\* \* \* \* \*